US008526718B2

(12) United States Patent
Rao

(10) Patent No.: US 8,526,718 B2
(45) Date of Patent: *Sep. 3, 2013

(54) SERVER AND CLIENT APPLICATION FOR COLOUR BASED COMPARISON, SELECTION AND PURCHASE

(76) Inventor: Bindu Rama Rao, Laguna Niguel, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/479,463

(22) Filed: May 24, 2012

(65) Prior Publication Data

US 2012/0236144 A1    Sep. 20, 2012

Related U.S. Application Data

(63) Continuation of application No. 12/080,524, filed on Apr. 2, 2008, now Pat. No. 8,229,210.

(51) Int. Cl.
*G06K 9/00* (2006.01)
(52) U.S. Cl.
USPC ......................................................... 382/162
(58) Field of Classification Search
USPC ................. 382/162, 164–165, 167, 312–313; 358/447, 518; 178/18.09; 345/158; 348/242, 348/253; 715/781, 783, 786, 788, 790, 792–794, 798, 715/801, 803, 830, 838, 845
See application file for complete search history.

(56) References Cited

U.S. PATENT DOCUMENTS

| 7,119,760 | B2 * | 10/2006 | Edge et al. | 345/2.1 |
|---|---|---|---|---|
| 7,149,984 | B1 * | 12/2006 | Rock et al. | 715/838 |
| 7,934,167 | B2 * | 4/2011 | Happonen | 715/786 |
| 8,194,986 | B2 * | 6/2012 | Conwell | 382/224 |
| 8,250,492 | B2 * | 8/2012 | Kondaks | 715/859 |

* cited by examiner

*Primary Examiner* — Jose Couso

(57) ABSTRACT

A mobile device comprising a camera and color detection software stored in memory of the mobile device, wherein the color detection application analyzes and displays component colors in a captured image and compares component colors in two such captured images. The color detection application displays component colors in a specific format such as red, green and blue and displays percentage of these colors in each of the compared images. The color detection provides textual and audio feedbacks of the extent of match between colors of the two images. The two captured images that are to be compared are displayed in split windows. A client-application compares a first digital image with a second digital image and describes the closeness of a color of the first digital image to the color of the second digital image.

12 Claims, 8 Drawing Sheets

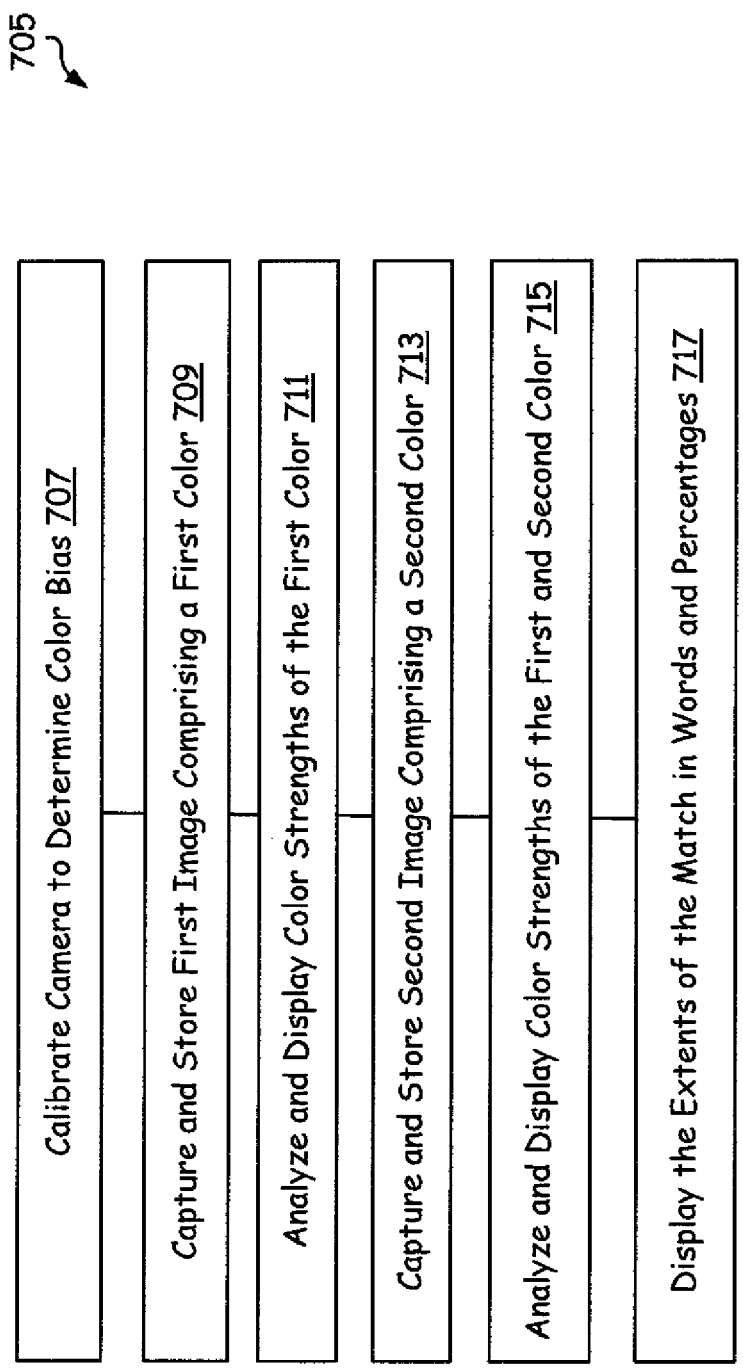

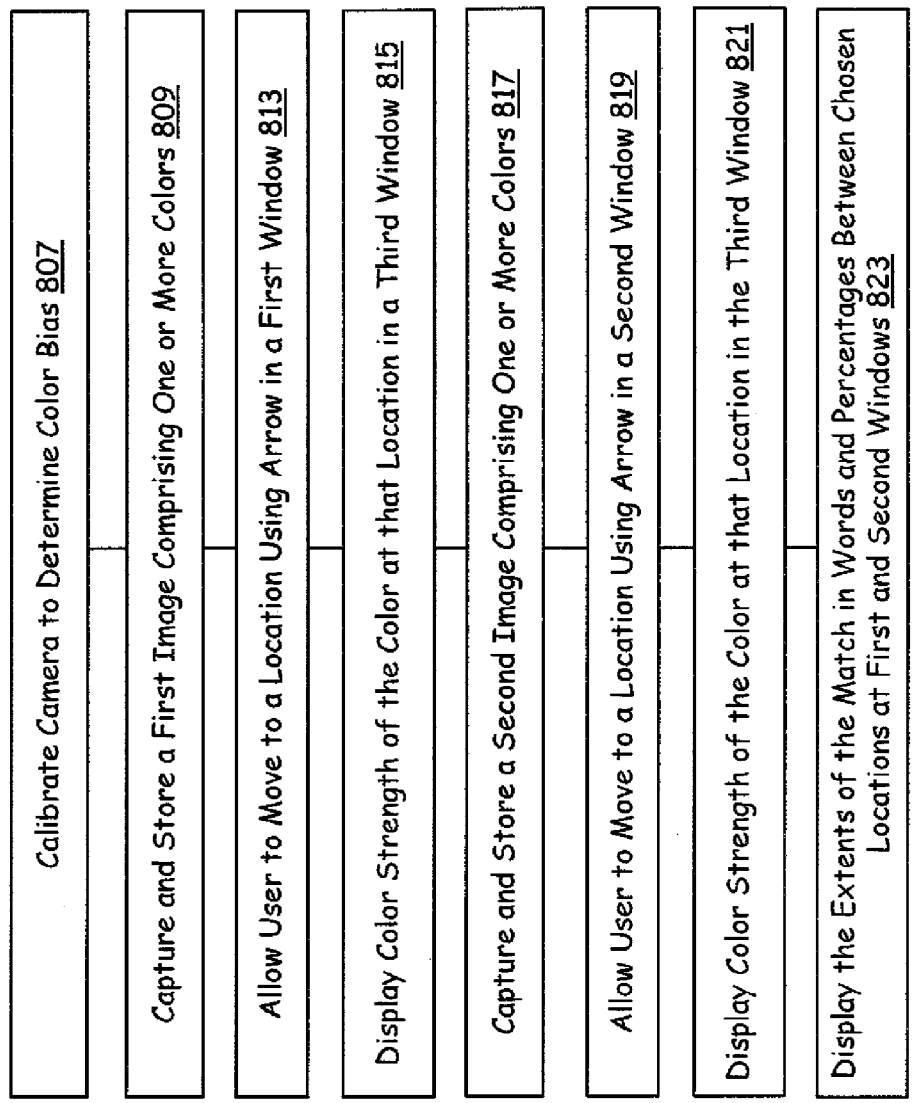

SERVER AND CLIENT APPLICATION FOR COLOUR BASED COMPARISON, SELECTION AND PURCHASE

CROSS REFERENCES TO RELATED APPLICATIONS

The present application is a continuation of, makes reference to, claims priority to, and claims benefit of U.S. non-Provisional application Ser. No. 12/080,524 entitled MOBILE DEVICE WITH COLOR DETECTION CAPABILITIES filed on Apr. 2, 2008 now U.S. Pat. No. 8,229,210, the complete subject matter of which is hereby incorporated herein by reference, in its entirety.

BACKGROUND

1. Technical Field

The present invention relates generally to mobile devices; and, more particularly, to the ability to detect a color of an item, compare colors and make product selections based on color.

2. Related Art

Often, a user needs to buy an item, such as a shirt, that needs to match another item that the user already possesses, such as a pant. Trying to find a pant that matches the color of the shirt is a big problem. The user is often forced to carry the shirt with him to several different stores trying to find a matching pant, one that matches the color and fabric feel.

Similarly, when a user has to fix a scratch or chip on a painted wall, the user has to take a paint chip to the store to purchase the right kind of paint. Often, just relying upon a generic name such as peach will not suffice as paint is available in several shades of peach and it is difficult to guess which particular one might better match the paint on the wall at a user's home. Taking a paint chip to one or more stores in order to purchase the matching color paint is a painful task, with the user often loosing or misplacing the paint chip and having to get a second piece of paint chip from the wall to the store.

Some individuals purchase an item in a store and take it home only to discover that the item does not match the color of the walls or the color of the floor or both. Having to factor in the colors of walls and floors, etc., in a typical purchase at a store far from ones home is not easy, and often results in the user guessing them wrong. Without having access to such information at a point of purchase, such as a store, the user cannot rely upon memory to adequately determine the colors of things at home that can be a right match for the item in front of the user at the store.

Ever since the beginning of mobile phones as devices meant for voice communication, the improved performances of these devices have made them multifunctional devices that incorporate keeping record of appointments and schedules, storing addresses, presenting calendars, surfing Internet, playing games among many other, and can be run from any convenient location. The improved performances have led to operating these devices using operating systems. Today's mobile devices typically include high performance cameras that can take pictures as well as video clips.

Mobile devices have been used to take pictures, send pictures and receive video programs. But quite often, people who are color blind are not able to see the pictures properly.

Having operating systems not only make these devices multifunctional but also allow programmers to write ever-more sophisticated programs that include applications such as word processing, accounting and programs written to process variety of inputs such as music and other audio clips (such as mp3), and also video clips and movies (such as mp4). The sources of these audio or video clips may be Internet or downloaded mp3 or mp4 files from other devices, while some of the video clips and pictures may be from the built in cameras.

The mobile devices may be networked with external devices such as other mobile phones, laptops and personal computers via infrared or Bluetooth. They can also communicatively couple with external servers via Internet using WiFi interfaces and built in modems. Mobile devices come with wide variety of features, some have small screens and few soft (programmable) keys while many others have larger screens with multiple soft keys. They are also available with alpha numeric keyboards or with keypad on the screen that are operated using a stylus.

Using operating systems, programmers write applications for these mobile devices using one of many programming languages such as XML (eXtensible Markup Language). Some of these programs may be incorporated into the permanent memory of the devices by the manufacturers while others may be written by independent programmers which are downloaded using a flash memory or from an external server via Internet. These programs accomplish many tasks such as managing daily tasks, assisting marketing, keeping data and files stored, managing databases etc. All these capabilities and high performance levels have not yet been harnessed to adequately address the needs of people trying to purchase items that match (at least in color and texture) those things they may already have or have access to. New inventions are needed that provide users tools to perform many daily tasks as well as some specialized tasks. Some of these specialized tasks have to be also incorporated into mobile devices, such incorporation exposes a different set of challenges.

Computer monitors reproduce every color you see on your screen using a combination of red (R), green (G), and blue (B) light. R, G, and B each have 256 possible depths, making it possible for your computer to generate more than 16 million different possible RGB colors—though some older monitors or graphics cards may not be able to display the full range.

These and other limitations and deficiencies associated with the related art may be more fully appreciated by those skilled in the art after comparing such related art with various aspects of the present invention as set forth herein with reference to the figures.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

FIG. 7 is a flow diagram illustrating functionality of the mobile device of FIG. 1 wherein the mobile device analyzes and compares two colors in two captured images, in accordance with the present invention; and FIG. 8 is a flow diagram illustrating functionality of the mobile device of FIG. 1 wherein the mobile device analyzes and compares two colors in two captured images in any given location, in multi colored images.

DETAILED DESCRIPTION OF THE DRAWINGS

Figure 1:
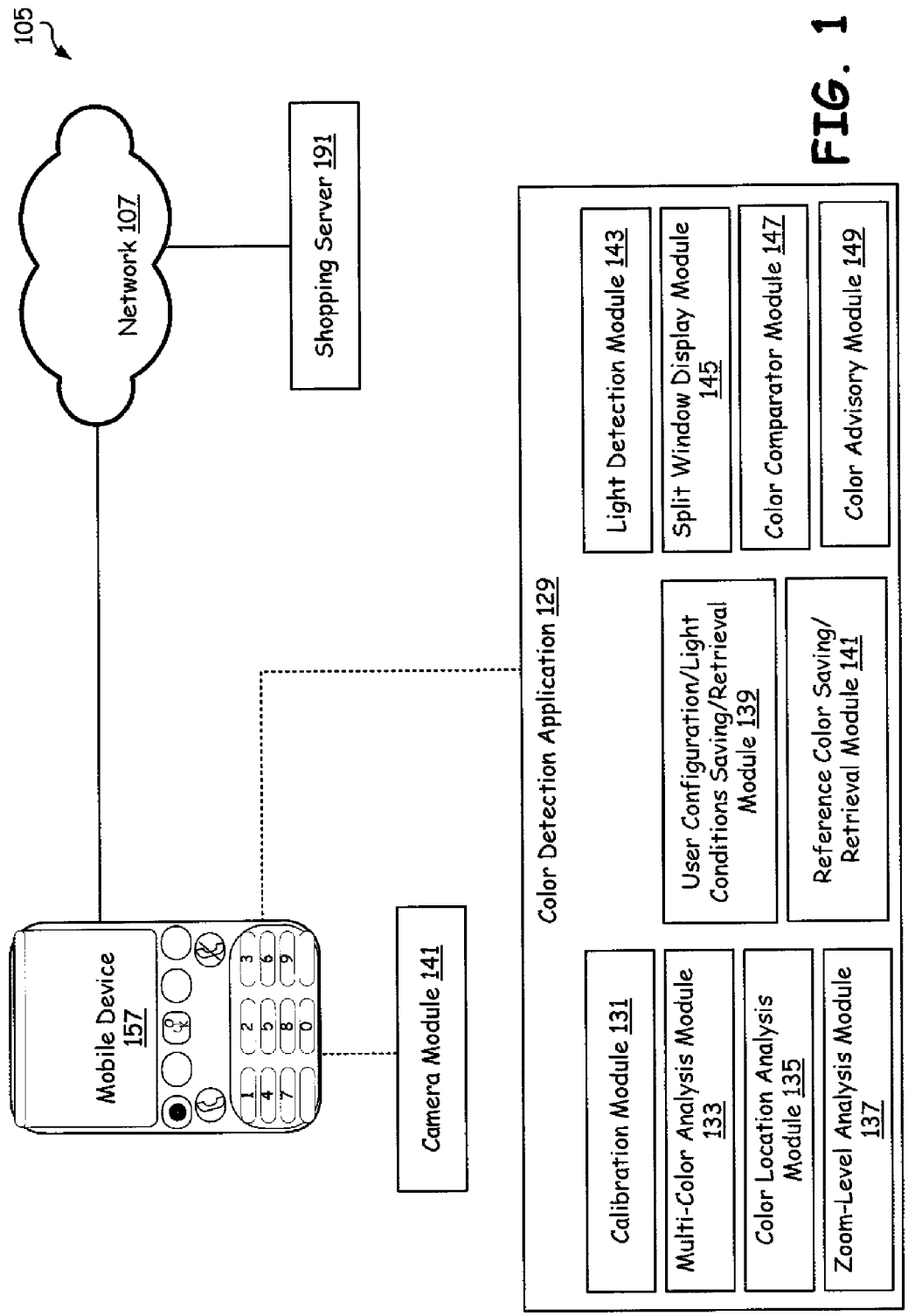
FIG. 1 is a schematic block diagram of a mobile device capable of color detection using a camera wherein the color detection is also accompanied by comparison of color with a reference image or a reference color so as to provide the user a color match information.

FIG. 1 is a schematic block diagram of a mobile device 157 capable of color detection using a camera 141 wherein the color detection is also accompanied by comparison of color with a reference image or a reference color so as to provide the user a color match information. The mobile device 157 comprises a color detection application 129 incorporated into the mobile device 157 and it employs the camera 141 wherein the color detection application 129 analyzes colors in a picture captured by the camera 141 and compares colors in two such captured pictures. In specific, the color detection application 129 analyzes a captured picture for colors in the captured picture based upon a color format. It also compares colors in two captured images and displays results in terms of color strengths as well as in words and in the form of audio feedbacks to the user. The color model or format might be RGB (red, green and blue) or RYB (red, yellow and blue), among others. When exact chromaticities of the red, green and blue primaries are defined, the color model then becomes an absolute color space, such as sRGB. Transparency can also be incorporated into the color model, as supported in the RGBA color models. The color strengths such as strengths of red, green and blue colors in percentage, in a given image are displayed. In a multi colored image, the color strengths at any given location is analyzed and displayed.

The color detection application 129 initially calibrates the camera 141 for color bias. For example, the captured image may have strong blue tint and lower strength of red color. To remove this bias, a calibration image (typically having three colors of given color format such as RGB) is captured and the color detection application 129 analyzes this image and compares the results with preset color strengths of the color format. The results are used to calibrate the camera 141 and the color bias is removed from the analysis of all future captured images based on this calibration data. This results in an accurate comparable analysis not only between two images captured by the same camera but also between two different cameras. In one embodiment, the calibration incorporates ambient light information. In another, it incorporates light metering.

A user might use the color detection application to analyze a color from a picture taken with the camera module 141 in the mobile device 157. When the user intends to compare two images (rather than just analyze color strengths of one captured image), the user chooses a 'comparison mode' in the color detection application 129. Then the user captures an image of a color, say from a sofa set, by keeping the mobile device at a fixed distance from the sofa (for example, 12 inches). This image is used as a reference image and is automatically stored in the memory of the mobile device 157 for later use. Then, the color detection application 129 exits with the user pressing exit button. The stored reference image may be given a name by the user for recall later when needed. Alternatively, the color detection application 129 assigns a name to the reference image while storing. Storing can be conducted using RGB color formats or in indexed format, based on preferences, using graphic file storage formats such as JPEG, GIF, etc.

Then, the user at a different time (say few days later at a shopping center) reopens the color detection application 129 and again chooses comparison mode and recalls the stored reference image. The stored reference image appears in one of a split windows called reference color window and the other of the split windows, called purchase item color window (or current item display), displays the current camera image. And the user is requested to capture purchase item color by again keeping the camera at the fixed distance (such as a recommended distance) from the image. The purchase item color may be that of a pillow (that the user wants to match to the sofa set). The two captured images (reference image and purchase item image) appear in two split windows.

Next, the user presses 'compare' button. The color detection application 129 analyzes the two colors and displays the color strengths of each image side by side allowing the user to determine the closeness of match. For example, the color detection application 129 displays "Reference Image: Red: 10%, Blue 47%, Green 43% and Purchase Item Image: Red: 12%, Blue 47%, Green 41%). In addition, the color detection application 129 also displays closeness of match in words (based upon a preset overall percentage margins) such as "Overall Result: Compares within 10%, Close Enough" or "Overall Result: Compares within 10%, Almost the Same" or "Overall Result: Compares within 40%, Does not Match", etc. The color detection application 129 also provides audio feedback regarding the match such as "close enough", "almost the same" or "does not match", etc.

In one embodiment, the color detection application 129 suggests what type of item selection is needed, based on the color comparison it conducts. For example, it suggests "Need more blue", or "Need a darker shade of green", etc.

When a multi colored reference image and purchase item image are captured, the color detection application 129 provides a cursor on each of the images in the split windows. The user may move the cursors to any location in the images and then press 'compare' button. The color detection application 129 then compares the colors at the user chosen location of the images and displays the results as mentioned above. For a multi colored image comparison, the user may go to 'multi colored image comparison mode' and the color detection application 129 allows the user to repeatedly compare colors at various locations of the images.

The color detection application 129 also provides options of different zoom levels and light detection modes. The light detection modes assist the user in figuring out exact conditions under which the images are captured. The color detection application 129, in addition, allows the user to save user configuration and light conditions for subsequent replication. The reference images (one or more images) may also be stored locally in the mobile device 157 along with a couple of lines of text that indicate what a reference image is of. They may be recalled anytime later for analysis and comparison. In one embodiment, the color detection application 129 normalizes the captured images to a reference light condition before comparison. In a different embodiment, it modifies the captured image colors to light conditions noted for (associated with) the reference image.

To aid in online purchase of items for sale, wherein the color of the item to be purchased by the user can be requested by the user, the reference colors (from a reference image for example) can be communicated to an online merchant server. The reference color may also be retrieved along with configuration details and the user is able to send this to an online merchant or business to request, for example, a clothing (dress, pants, etc.) of a certain size and shape and of this reference color. A shopping server 191 (such as a online sale server provided by a branded departmental store), communicatively coupled to the mobile device 157 via a network 107, replies back to indicate if the item requested for purchase, such as a dress or clothing of the kind requested by the user based on reference color details, are available and in stock.

In addition, the color detection application 129 has provisions to display advertisements in the mobile device 157, for example, clothing advertisements, by mentioning color strengths. The color detection application 129 also provides options to take multiple pictures, send them via email (only a color info may be sent, or the pictures too) to a recipient/vendor to provide information on an item available in any of those colors. For example, the color detection application may be used to do home furnishings, by sending a color information of a wall and carpets/flowing to a furniture website and receiving offers for appropriate matching/contrasting furniture or paints.

The color detection application 129 has many modules to perform above mentioned tasks, they include, a calibration module 131, a multi-color analysis module 133, a color location analysis module 135, a zoom level analysis module 137, an user configuration/light conditions saving/retrieval module 139, a reference color saving/retrieval module 141, a light detection module 143, a split window display module 145, a color comparator module 147 and a color advisory module 149. The calibration module 131 analyzes a calibration image and stores the color bias details in the mobile device 157 for later use. The multi color analysis module 133 and the color location analysis module 135 provide a cursor in the split windows and allow the user compare multi colored images in any given location. The color advisory module 149 provides textual and audio feedback to the user regarding the extent of match along the lines mentioned in the above paragraphs.

For example, a user may intend to paint dirtied areas of the wall and may be looking for paint that matches the color of the wall. After initial calibration, the user activates the color detection application 129 and presses the 'compare' button (for example, a soft key on the mobile device 157). The color detection application 129 verifies if this is a reference image. Then, the user captures a reference image of the wall by keeping the mobile device 12 inches (for example) away from the wall in a clean location and presses 'save' button. Then the user may exit from the application. Later in a paint store, the user activates the color detection application 129 again and presses 'compare' button and this time the user presses 'no' button during verification (that if this image is a reference image). Then the color detection application 129 allows user to load a reference image in one of the split windows and allows the user to capture another image. The user may obtain paint colors from the paint store wall, from a paint freshly mixed for the user, a swatch provided, or a booklet provided and captures a second image. The split windows display these two images side by side and the user presses 'analyze' button. The color detection application 129 analyzes the two colors and displays the color strengths of each image side by side allowing the user to determine the closeness of match. The color detection application 129 may display, for example, "Reference Image: Red: 20%, Blue 40%, Green 40% and Purchase Item Image: Red: 12%, Blue 47%, Green 41%". In addition, the color detection application 129 may also display closeness of match in words such as "Overall Result: Compares within 10%, Close Enough". In one embodiment, the user can request a recommendation by the color detection application 129 and it provides recommendations such as "need more green", "need a lighter shade of blue", etc. The color detection application 129 also provides audio feedback regarding the match.

In one embodiment, the mobile device 157 comprises a camera circuitry 141 and at least one memory module, for example as a flash memory module. It also comprises a color detection code stored in the at least one memory module. The color detection code is part of firmware in a related embodiment and an application in another related embodiment. It supports analysis of colors contained in an image captured by the camera circuitry 141. It also analyzes color contents in a first image captured by the camera circuitry based on a first color format/model (such as RGB) and the color contents in a second image captured by the camera based on the first color format/model. It then displays a color content comparison information between the first image and second image. It also displays the differences between the first image and second image in terms of the respective color contents (for example in terms of RGB values). Thus, the mobile device 157 advises the user on how close the colors of first image are to the colors of the second image. It also displays the first and second images side by side and also provides information on the differences between the two. In some embodiments, it displays the extent of match between the first image and the second image in words. The first and second pictures can contain multiple colors too in different locations. The mobile device displays red, green and blue color contents in the first and second pictures, in a given location, or in multiple locations in the first and second images.

In one mode of operation of the device, the color strengths between images are typically displayed in percentages and comparison is made on the basis of the percentages of color strengths. In another mode, HSL and HSV representations of points in an RGB color space, is employed, which are often used to describe perceptual color relationships. In some modes, CMYK are used for color models (often defined as a subtractive color model). In one mode, the color detection application 129 employs ICC based color profiles for comparing colors in images. It also incorporates a device profile for calibrating the device's color characteristics. Different devices have their own device profiles. The device profiles obtain their openness by using a well-defined reference color space and by being capable of being interpreted by any ICC operating system or application that is compliant with the ICC specification. In combination with profiles for other devices color transformations may be determined that enable colors captured on one device to be reproduced satisfactorily on many others. The information required in the profile is adequate to ensure the level of color fidelity selected by the user and for the design of a default color management module (CMM) for the device to transform color information between native device color spaces. Such CMMs are typically found in many operating systems and in the color detection application 129. In addition to providing a cross-platform standard for the actual profile format, the ICC specification also describes the convention for embedding these profiles in the images captured that may be compared to other images.

Embedded profiles allow users to transparently move color data between different computers, networks and even operating systems without having to worry if the necessary profiles are present on the destination systems. The intention of embedded profiles is to allow the interpretation of the associated color data by the recipient device.

In one embodiment, based on the ICC specifications, the color detection application 129 (in accordance with The International Color Consortium Profile Format) supports a variety of device-dependent and device-independent color spaces divided into three basic families: 1) CIEXYZ based, 2) RGB based, and 3) CMY based (including CMYK). A subset of the CIEXYZ based spaces are also defined as connection spaces.

In one embodiment, the calibration module 131 accesses (by remotely downloading or locating a locally available file) a digital reference file specific to a calibration target image, the calibration target image being a printed piece that includes photographic images, grayscale bars, and color bars that help calibration. The target image is associated with the digital reference file specific to that image. The calibration module 131 compares a digital photograph of the calibration target image to the color information in the reference file to create an ICC profile specific to the camera module 141. It then uses the created ICC profile to perform automatic color correction when digital images are taken with the camera module 141. In a related embodiment, automatic color correction helps to solve defects that are common in digital camera images, including; insufficient saturation or bad white balance adjustment resulting in unnatural, dull colors or skin tones and insufficient contrast.

In one embodiment, the calibration module 131 employs a device specific ICC profile for the camera module 141 of the mobile device 157 (and even for the display of the mobile device 157) to provide a way to insure consistent color detection. The ICC profile that is specific to the mobile device 157 contains information about how that mobile device 157 produces color. Since the mobile device 157 comes with a generic color profile for the camera module 141, it employs automatic color correction to calibrate the camera module 141.

The present invention also makes it possible for a user using the mobile device 157 with the camera module 141 to determine a distance of a wall or object from the camera and recommend the use of a flash (or recommend that the flash not be used, etc.) based on current camera settings and capabilities. It can also determine distance of an object and display them or store them in the mobile device 157, such distance measurements being facilitated by the camera module 141 that comprises an infra-red beam to aim it at objects and measure the light coming back and determine the distance of the object based on computations. The use of sound waves for distance measurements is also contemplated. The sound waves are emitted from the mobile device 157 or the camera module 141 and the delay is measured in their reflection and a distance to the subject is calculated. In the embodiments that employ the infrared light, triangulation the distance to the subject is the method of computing the distance.

Figure 2:
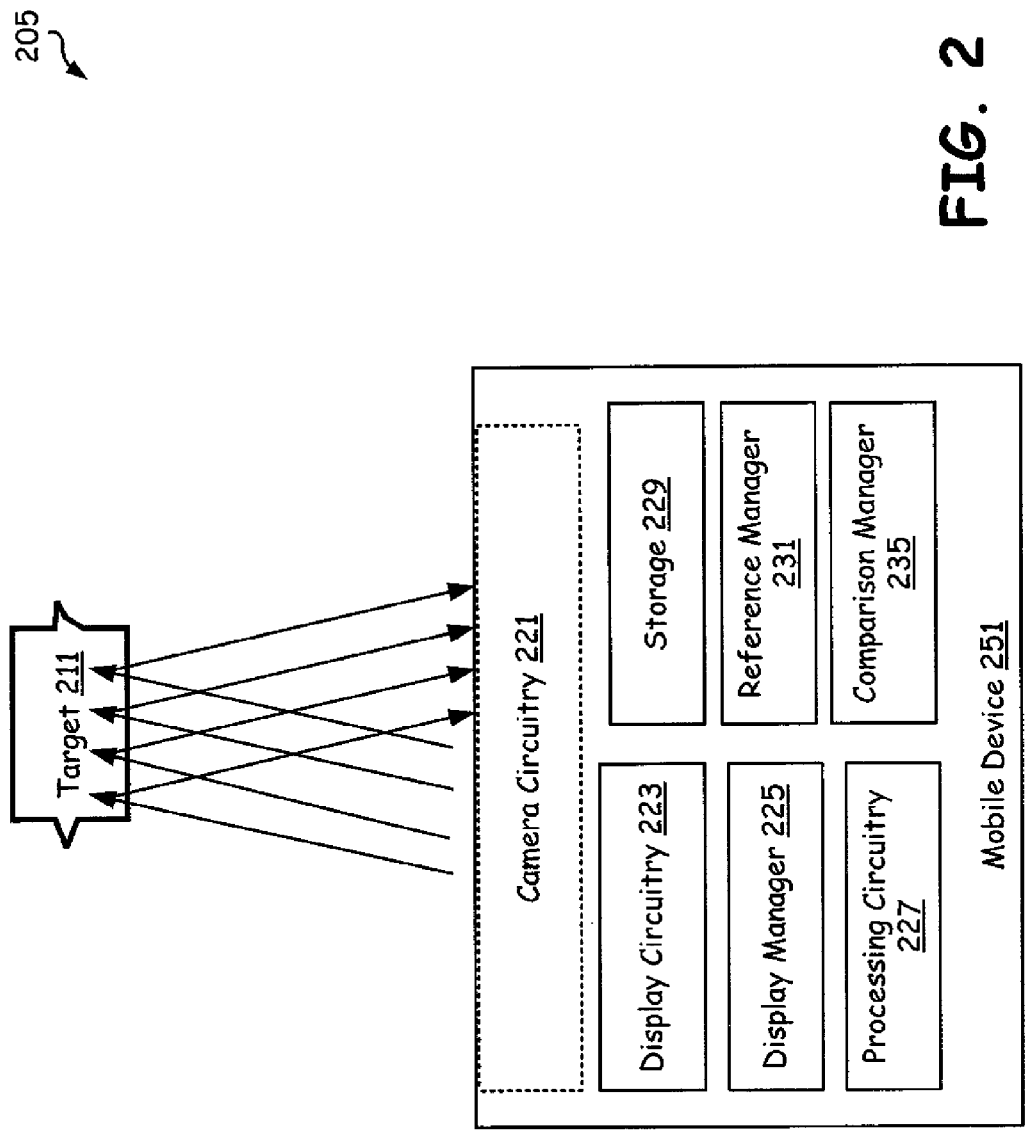
FIG. 2 is a schematic block diagram illustrating components of the mobile device constructed in accordance with the embodiment of FIG. 1 of the present invention.

FIG. 2 is a schematic block diagram illustrating components of the mobile device constructed in accordance with the embodiment of FIG. 1 of the present invention. The mobile device circuitry 251 generally includes a camera circuitry 221, a display circuitry 223, a display manager 225, a processing circuitry 227, a local storage 229, a reference manager 231 and a comparison manager 235. These components communicatively coupled to one another via one or more of a system bus, dedicated communication pathways, or other direct or indirect communication pathways. The processing circuitry 227 may be, in various embodiments, a microprocessor, a digital signal processor, a state machine, an application specific integrated circuit, a field programming gate array, or other processing circuitry. Local storage 229 may be random access memory, read-only memory, flash memory, a disk drive, an optical drive, or another type of memory that is operable to store computer instructions and data.

The camera circuitry 221 captures image of a target 211 by utilizing a flash built in to the circuitry 221, as needed. Typically the image is captured by keeping the camera at a close range, such as 12 inches from the target. The target 211 may be a wall whose paint is to be replaced, a sofa set for which matching pillows or matching carpet are required, clothing for which matching a clothe is required. Display circuitry 223 typically comprises frame buffers for storing image data and logical combining data. The display circuitry 223, together with display manager 225, process and display camera images received from the camera circuitry 221 (of target 211). The image, when it is a reference image, is displayed in a single window, while in a comparison mode both reference and a second image, that of a current item being captured such as a image of an item being considered for purchase, are displayed in split windows.

The storage 229 is used to store/retrieve code corresponding to the color detection application (129 of FIG. 1, not shown in this illustration), which is responsible for color analysis and comparison of target images such as 211. The color detection application (129 of FIG. 1) comprises a calibration module, a multi-color analysis module, a color location analysis module, a zoom level analysis module, an user configuration/light conditions saving/retrieval module, a reference color saving/retrieval module, a light detection module, a split window display module, a color comparator module and color advisory module, that assist in calibration, processing of color images, split window displays, color analysis and comparison at a given location, storing and retrieval of reference and purchase item images, storing and retrieval of user configurations and light conditions, zoom level etc.

In other embodiments, the mobile device 251 of the present invention may include fewer or more components than are illustrated as well as lesser or further functionality. In other words, the illustrated mobile device circuitry is meant to merely offer one example of possible functionality and construction in accordance with the present invention.

In one embodiment, the mobile device 251 is a digital camera that is capable of color detection and comparison capabilities that also incorporates the functionality provided by the color detection application.

Figure 3:
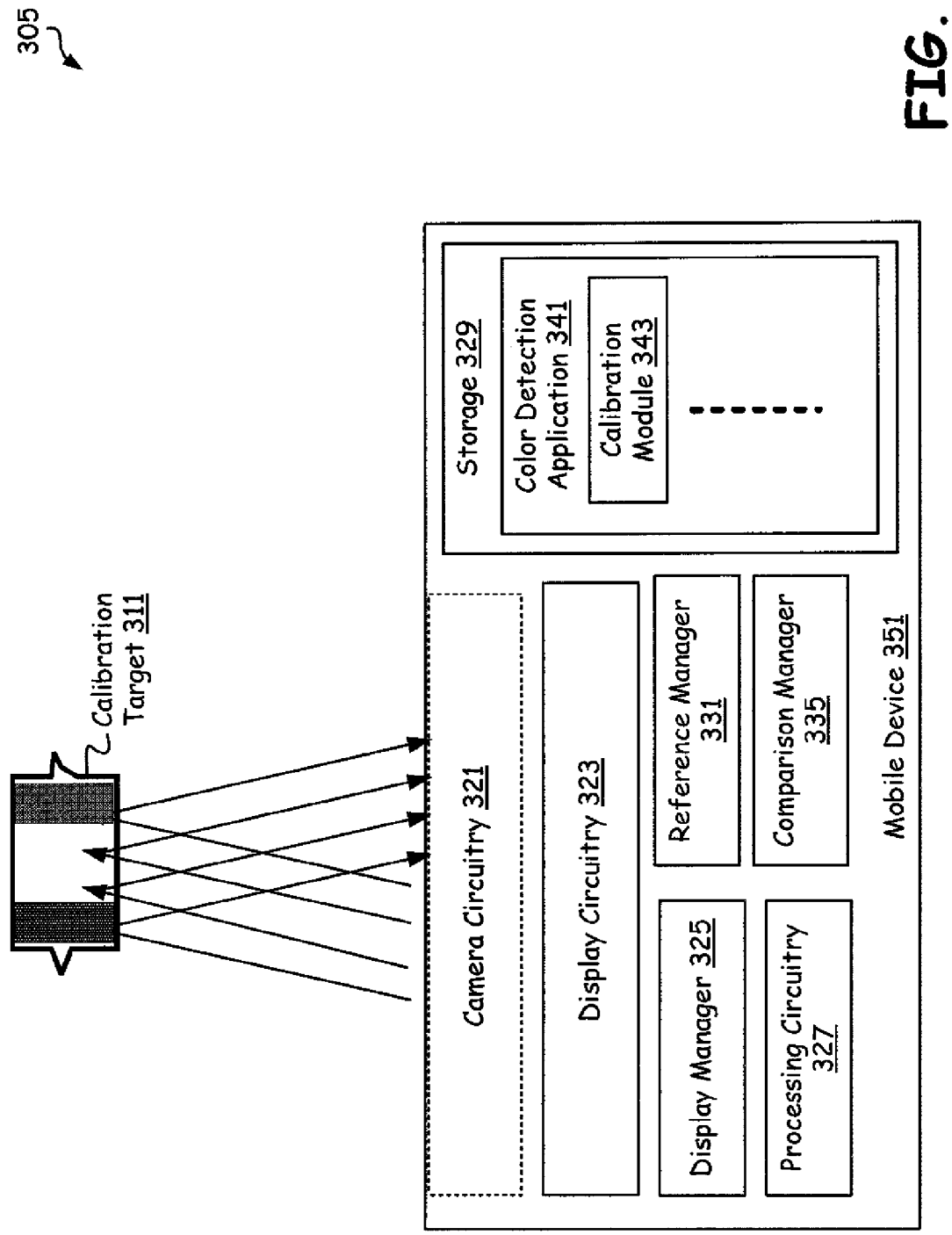
FIG. 3 is an exemplary schematic block diagram illustrating calibration of the mobile device by the color detection application of FIG. 1.

FIG. 3 is an exemplary schematic block diagram illustrating calibration of the mobile device by the color detection application of FIG. 1. The mobile device circuitry 351 generally includes camera circuitry 321, display circuitry 323, display manager 325, processing circuitry 327, local storage 329, reference manager 331 and comparison manager 335. These components communicatively coupled to one another via one or more of a system bus, dedicated communication pathways, or other direct or indirect communication pathways. The processing circuitry 327 may be, in various embodiments, a microprocessor, a digital signal processor, a state machine, an application specific integrated circuit, a field programming gate array, or other processing circuitry.

Local storage 329 may be random access memory, read-only memory, flash memory, a disk drive, an optical drive, or another type of memory that is operable to store computer instructions and data. The storage 329 contains color detection application 341. The color detection application 341 contains calibration module 343, multi-color analysis module, color location analysis module, zoom level analysis module, user configuration/light conditions saving/retrieval module, reference color saving/retrieval module, light detection module, split window display module, color comparator module and color advisory module (not shown in this illustration).

The camera circuitry 321 captures image of a calibration target 311 by utilizing a flash built in to the circuitry 321. The calibration target 311 may be provided along with the color detection application 341, which may be a small paper sheet containing three different colors such as red, green and blue. It may also comprise checks, bars, lines, geometric shapes, etc. Typically the image of calibration target is captured by keeping the camera at a close range, such as 12 inches from the target. Then, the calibration module 343 analyses the calibration image and compares the results with that of predefined color strengths that are attributed to the calibration target 311 colors. The results are stored in storage 329 and utilized to correct color bias every time a new reference or purchase item image is captured. In a related embodiment, the calibration module 343 analyses a device specific ICC profile that is retrieved, in order to calibrate the camera module. Based on such calibration data created (or retrieved) the mobile device 351 can conduct automatic color correction on images captured.

In other embodiments, the mobile device 351 of the present invention may include fewer or more components than are illustrated as well as lesser or further functionality. In other words, the illustrated mobile device circuitry is meant to merely offer one example of possible functionality and construction in accordance with the present invention.

Figure 4:
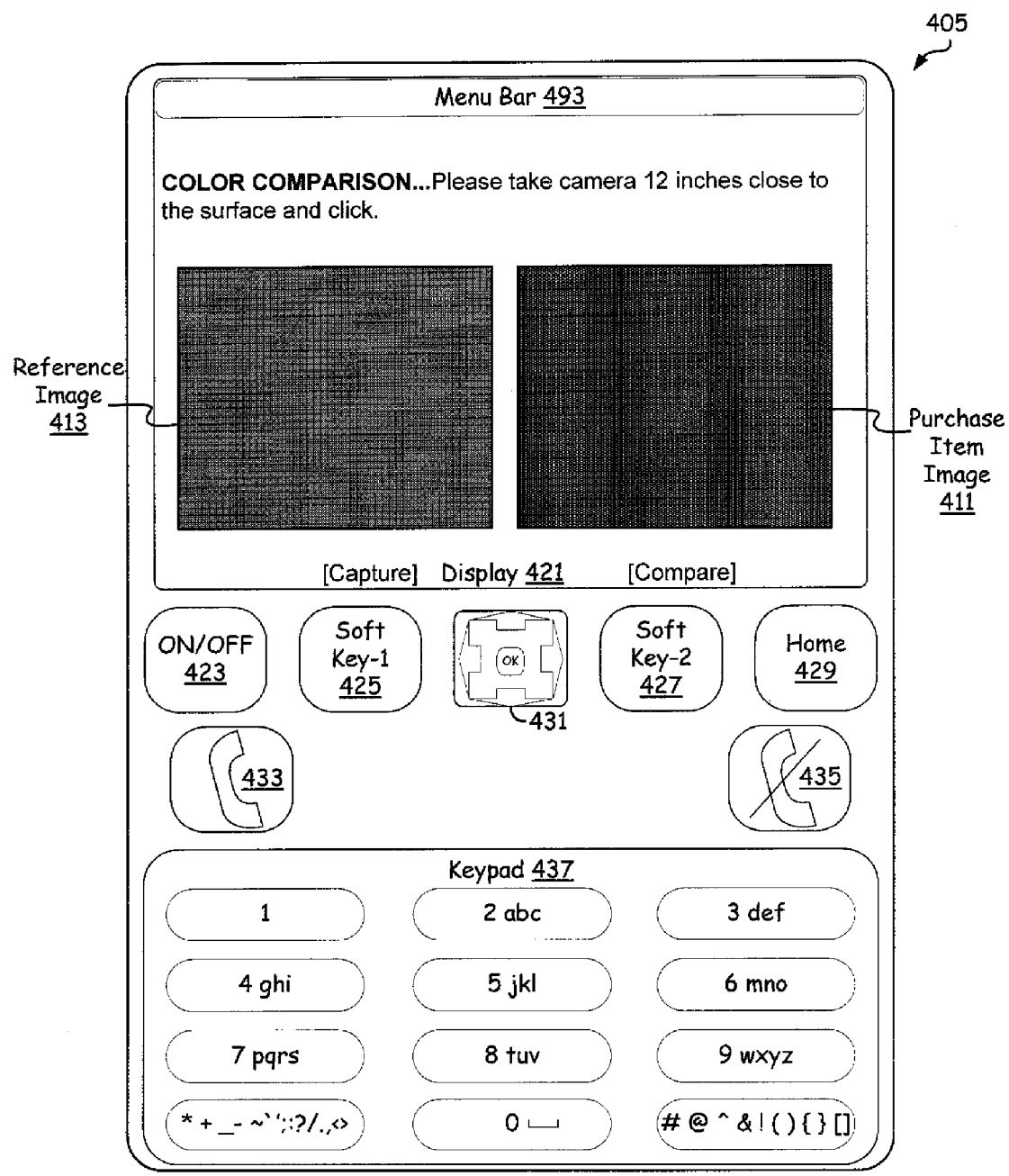
FIG. 4 is an exemplary schematic block diagram illustrating snap shot of a mobile device displaying two captured images side by side in split windows.

FIG. 4 is an exemplary schematic block diagram illustrating snap shot of a mobile device displaying two captured images side by side in split windows. Only two soft keys 425, 427 are considered in the illustration, however many mobile devices may have more than two soft keys which are utilized in designing color detection application. A typical mobile device 405 has a keyboard 437 containing alpha-numeric keypad 437, an 'ON/OFF' button 423, scrolling keys (up, down, right and left) 431, 'home' button 429, 'call' button 433, 'end call' button 435, soft keys 425, 427 and a display 421. The display 421 contains a menu bar 493 and a display area that in the current illustration shows an exemplary color comparison in split windows.

The illustration shows a title 'COLOR COMPARISON . . . Please take camera 12 inches close to the surface and click'. In addition, the split window shows reference image 413 and purchase item image 411. These images may be visually compared by a user before allowing the color detection application to analyze the color strengths of the images.

Initially, the user may activate the color detection application in prior screens by utilizing the menu of the mobile device and press 'compare' button. The color detection application verifies if this is a reference image. Then, the user captures a reference image 413 by keeping the mobile device 12 inches away from the target and presses 'save' button in one of prior screens. Then, at a later time, the user activates the color detection application again and presses 'compare' button. This opens up the split windows illustrated with first of the windows containing reference image 413 and the second window containing purchase item image 411. The user may capture the purchase item image 411 by pressing 'capture' soft key 425. The purchase item image 411 appears frozen on the second window. The split windows display these two images side by side and the user presses 'compare' button, by pressing the soft key 427. The color detection application analyzes the two colors and displays the color strengths of each image side by side allowing the user to determine the closeness of match.

Figure 5:
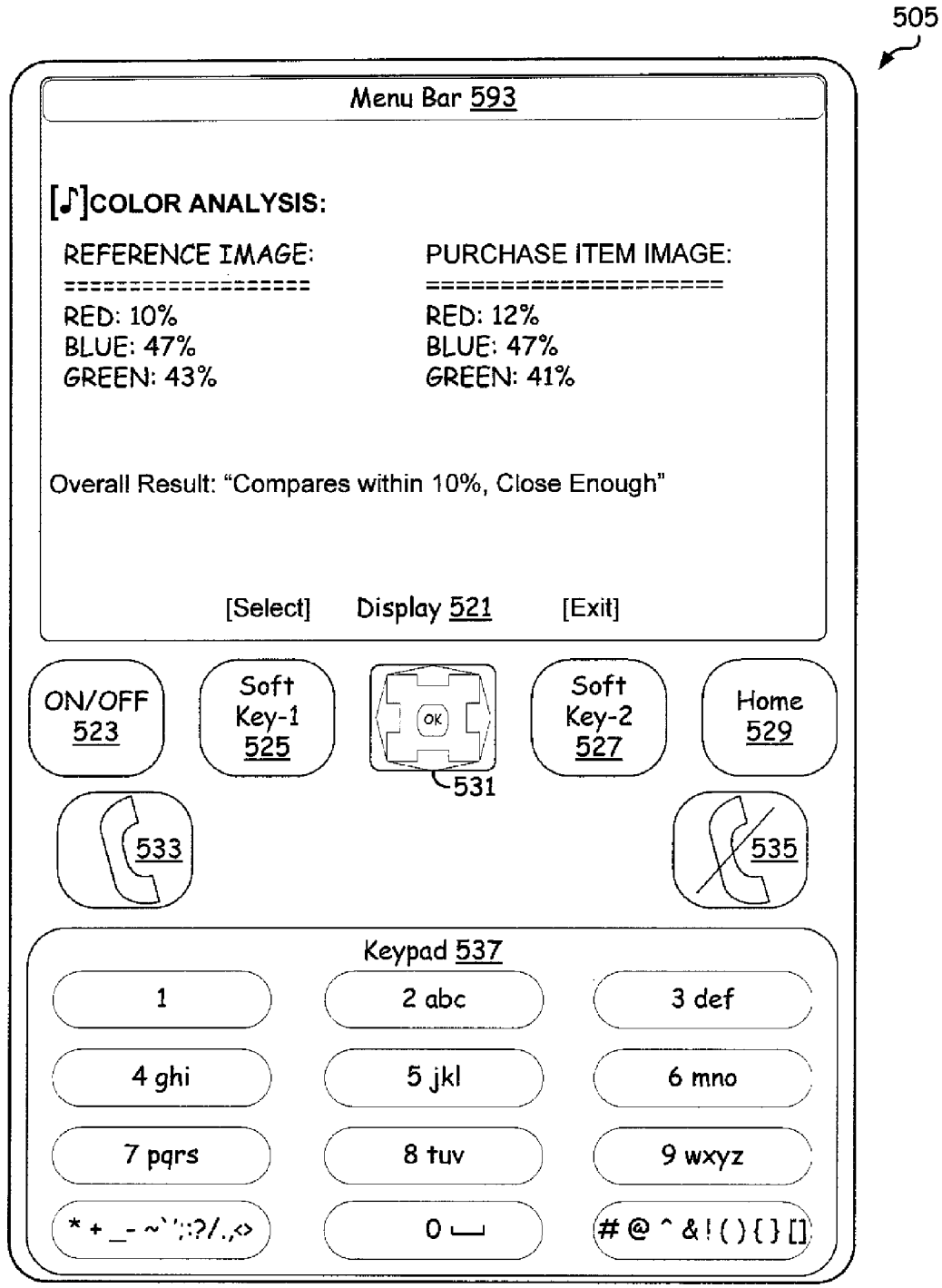
FIG. 5 is an exemplary schematic block diagram illustrating snap shot of a mobile device displaying comparisons between two captured images.

FIG. 5 is an exemplary schematic block diagram illustrating snap shot of a mobile device displaying comparisons between two captured images. Only two soft keys 525, 527 are considered in the illustration, however many mobile devices may have more than two soft keys which are utilized in designing color detection application. A typical mobile device 505 has a keyboard 537 containing alpha-numeric keypad 537, an 'ON/OFF' button 523, scrolling keys (up, down, right and left) 531, 'home' button 529, 'call' button 533, 'end call' button 535, soft keys 525, 527 and a display 521. The display 521 contains a menu bar 593 and a display area that in the current illustration shows an exemplary color analysis and comparison.

The illustration shows a title 'COLOR ANALYSIS'. When the user presses 'compare' button in the illustration of FIG. 4, the color detection application displays, as illustrated, the color strengths of the two images. The illustration shows an exemplary comparison, that is, "Reference Image: Red: 10%, Blue 40%, Green 43% and Purchase Item Image: Red: 12%, Blue 47%, Green 41%". The overall result is also displayed textually, such as "Overall Result: Compares within 10%, Close Enough". In addition, a selectable icon such as '[♪]', when selected by using the soft key 525, plays audio version of the overall result.

Figure 6:
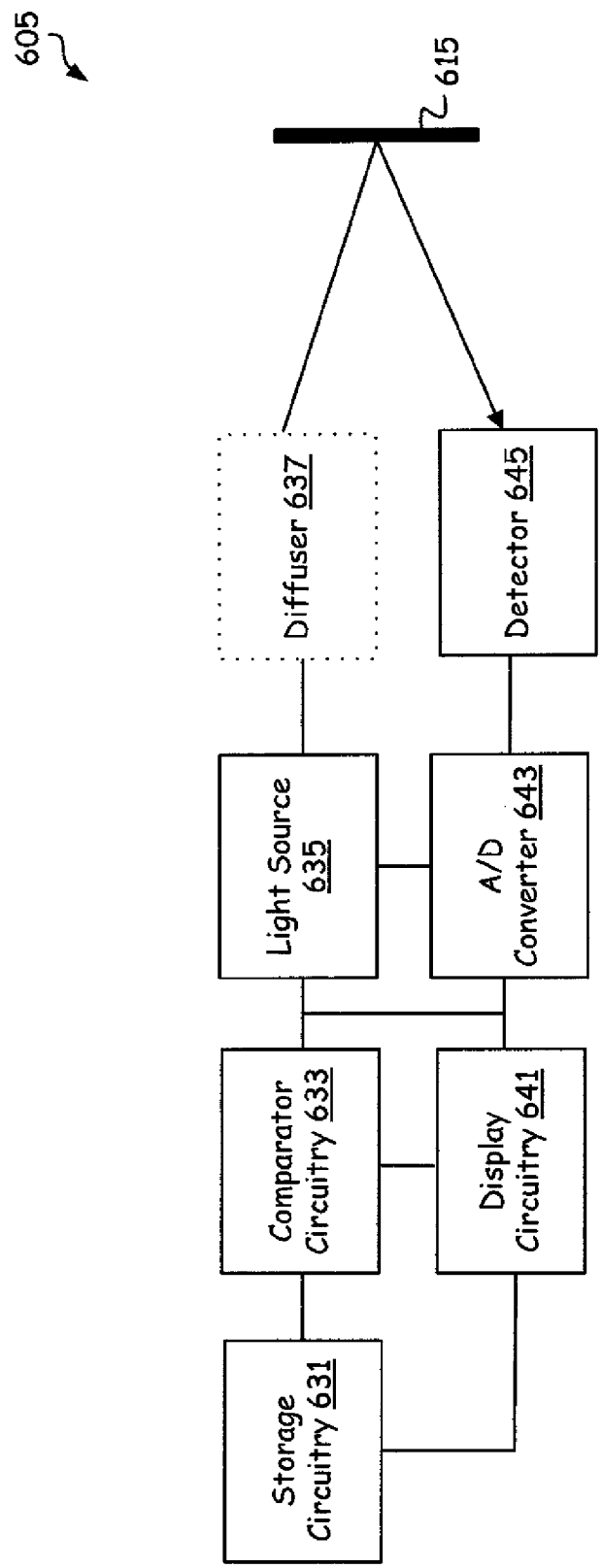
FIG. 6 is a schematic block diagram illustrating an electronic device that independently analyzes colors in a captured image.

FIG. 6 is a schematic block diagram illustrating an electronic device 605 that independently analyzes colors in a captured image. The electronic device 605 contains storage circuitry 631, comparator circuitry 633, light source (flash) 635, diffuser 637, display circuitry 641, analog to digital converter 643 and detector 645. The electronic device 605 also contains few buttons such as 'click' button, 'flash on/off' button, 'display modes' buttons (not shown in this illustration) etc. In another embodiment, the electronic device 605 may contain an independent processing circuitry (not shown) and the storage circuitry 631 containing a preprogrammed logic that manage the entire analysis and comparison processes and store the results appropriately.

Upon pressing the 'click' button, the light source 635 along with the diffuser 637 throws in light on a target 615 in a uniform diffused manner. The electronic device 605 may be placed 12 inches away from the target 615. The target 615 may be a wall whose paint is to be replaced, a sofa set for which matching pillows or matching carpet are required, clothing for which matching a clothe is required. The detector 645 detects light intensity at various wavelengths such as that of red, green and blue in analog fashion (that is, proportional electric currents in micro or milli amperes). The analog to digital converter 643 converts each of these light intensity electric currents to digital format and stores them in the storage circuitry 631.

The storage circuitry 631 also contains a preprogrammed logic that is initiated at this time, so that the comparator circuitry 633 is fed with a prior captured digital number that represents color strengths (say red, green and blue) of a previous target and the stored light intensity digital numbers to compare. The comparator circuitry 633 compares these two digital numbers. The display circuitry 641 converts the difference in light intensity to a percentage format and displays them on the screen.

In other embodiments, the electronic device 605 of the present invention may include fewer or more components than are illustrated as well as lesser or further functionality. In other words, the illustrated electronic device circuitry is meant to merely offer one example of possible functionality and construction in accordance with the present invention.

FIG. 7 is a flow diagram illustrating functionality of the mobile device of FIG. 1 wherein the mobile device analyzes and compares two colors in two captured images, in accordance with the present invention. The functionality of the mobile device begins at a block 707 when the user calibrates the camera for color bias. This is done by camera in the mobile device capturing image of a calibration target by utilizing a flash built into the camera. The calibration target is typically a small paper sheet containing three different colors such as red, green and blue. Typically the image of calibration target is captured by keeping the camera at a close range, such as 12 inches from the target. Then, the mobile device analyses the calibration image and compares the results with that of predefined color strengths that are attributed to the calibration target colors. The results are stored and utilized to correct color bias every time a new reference or purchase item image is captured.

At a next block 709, the mobile device captures and stores a first image (reference image) comprising a first color. At a next block 711, the mobile device analyzes and displays color strengths of the first color. The first color may be that of a wall whose paint is to be replaced, a sofa set for which matching pillows or matching carpet are required, clothing for which matching a clothe is required.

At a next block 713, the mobile device captures and stores a second image (purchase item image) comprising a second color. At a next block 715, the mobile device analyzes and displays color strengths of the second color. The second color may be that of a paint in a store, a pillow or matching carpet in a store, or clothe in a store.

At a next block 717, the mobile device displays the extents of the match in words and percentages. The mobile device displays the color strengths of each image side by side allowing the user to determine the closeness of match. For example, the mobile device may display "Reference Image: Red: 8%, Blue 47%, Green 45% and Purchase Item Image: Red: 14%, Blue 47%, Green 39%"). In addition, the mobile device also displays closeness of match in words (based upon a preset overall percentage margins) such as "Overall Result: Compares within 8%, Close Enough" or "Overall Result: Compares within 40%, Does not Match", etc. The mobile device also provides audio feedback regarding the match such as "close enough", "almost the same" or "does not match", etc.

FIG. 8 is a flow diagram illustrating functionality of the mobile device of FIG. 1 wherein the mobile device analyzes and compares two colors in two captured images in any given location, in multi colored images. The functionality of the mobile device begins at a block 807 when the user calibrates the camera for color bias. Calibration involves capturing image of a calibration target by utilizing a flash built into the camera. Then, the analyzed color strengths of the calibration target is compared with that of predefined color strengths that are attributed to the calibration target colors. The results are stored and utilized to correct color bias every time a new reference or purchase item image is captured.

At a next block 809, the mobile device captures and stores a first image (reference image) comprising one or more colors. At a next block 813, the mobile device allows the user to move to a location in the first image by using arrow in a first window. At a next block 815, the mobile device analyzes and displays color strengths of the first image at that location in a third window. The first image may be that of a wall whose paint is to be replaced, a sofa set for which matching pillows or matching carpet are required, clothing for which matching a clothe is required.

At a next block 817, the mobile device captures and stores a second image (purchase item image) comprising one or more colors. At a next block 819, the mobile device allows the user to move to a location in the second image by using arrow in a second window. At a next block 821, the mobile device analyzes and displays color strengths of the second image at that location in the third window. The second color may be that of a paint in a store, a pillow or matching carpet in a store, or clothe in a store.

At a next block 823, the mobile device displays the extents of the match in words and percentages in the third window. The percentages of color strengths and extents of match belong to the images at the location chosen by the user. The mobile device displays the color strengths of each image side by side in the third window allowing the user to determine the closeness of match. For example, the mobile device may display "Reference Image at Given Location: Red: 8%, Blue 47%, Green 45% and Purchase Item Image at Given Location: Red: 14%, Blue 47%, Green 39%"). In addition, the mobile device also displays closeness of match in words (based upon a preset overall percentage margins) such as "Overall Result: Compares within 8%, Close Enough" or "Overall Result: Compares within 40%, Does not Match", etc. The mobile device also provides audio feedback regarding the match such as "close enough", "almost the same" or "does not match", etc.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip", as used herein, refers to an integrated circuit. Circuits and circuitry may comprise general or specific purpose hardware, or may comprise such hardware and associated software such as firmware or object code.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A client application for a mobile device that supports a capture of a first digital image from a camera circuitry, the client application comprising:
   a first display panel to display the first digital image;
   a second display panel to display a second digital image;
   the client application presenting the first display panel and the second display panel juxtaposed, to enable a user of the mobile device to view both the first digital image and the second digital image next to each other simultaneously so as to compare them or study them; and
   the client application, when prompted by the user via user interface elements presented to the user by the client application, providing a measurement of color components and a description of the closeness of a first color associated with the first digital image to a similar or a second color associated with the second digital image.

2. The client application of claim 1 further comprising:
   the client application displaying a measurement of color components and a description of color at a user selected location or region on the first digital image, on the second digital image, or on both.

3. The client application of claim 1 further comprising:
   the client application receiving the second display image from a second mobile device communicatively coupled to the mobile device and displaying it in the second display panel.

4. The client application of claim 1 further comprising:
   the client application facilitating the capture of the first digital image by the user using the camera circuitry, presenting it in the first display panel, and optionally storing the first digital image captured in a memory or storage in the mobile device; and
   the client application receiving the second display image from a second mobile device, a remote computer or a server communicatively coupled to the mobile device and displaying it in the second display panel.

5. The client application of claim 1 further comprising:
   the client application communicating the first digital image to an online sales server communicatively coupled to the mobile device, and in response, receiving a plurality of digital images from the online sales server;
   the client application displaying each of the plurality of digital images one at a time, or a selected one of the plurality of digital images, in the second display panel; and
   the client application providing a measurement of color components and a description of the color closeness, color contrast, color coordination between the images currently displayed in the first display panel and the second display panel.

6. A software program for instructing a user's device of a user to perform a method supporting capture of digital images and comparison of colors, the method comprising:
   directing the user's device to support capture, retrieval or receipt of a first digital image, the capture facilitated by a camera circuitry in the user's device, the receipt facilitated by a communication circuitry in the user's device;
   directing the user's device to support capture, retrieval or receipt of a second digital image;
   directing the user's device to present the first digital image and the second digital image next to each other to enable visual comparison;
   determining a comparison result, the comparison result being at least related to the first digital image and the second digital image; and
   displaying the comparison result in a user readable format at a user selectable level of detail.

7. The method of claim 6 further comprising:
   directing the user's device, upon receiving the first digital image, to modify its visual presentation by enhancing the first digital image or applying a correction to compensate for a bias associated with the camera circuitry or the display component of the device.

8. The method of claim 6 wherein the second digital image is a reference image or a visual representation of a reference color, the method further comprising:
   directing the user's device, upon receiving the first digital image, to determine the comparison result by comparing the first digital image to a reference image or a reference color.

9. The method of claim 6 further comprising:
   allowing the user to repeatedly compare colors at various locations on the first digital image with a corresponding location on the second digital image.

10. The method of claim 6 further comprising:
    capturing ambient light conditions by a light conditions manager when the first digital image is captured and assigning an associated first ambient light conditions status; and
    modifying selectively the first digital image to correspond to a second ambient light condition status, associated with the second digital image or with a reference image, to enable the user to better compare the colors on the first and second digital images under similar ambient light conditions.

11. The method of claim 6 wherein each of the first and second digital images being in a first format, the method further comprising:
    modifying the first and second digital images to conform to a normalized ambient lighting conditions before comparing them; and
    providing a comparison result to the user, wherein the comparison result comprises at least one measurement of color components and at least one description.

12. The method of claim 6 further comprising:
    comparing the first digital image to each of a plurality of digital images to determine those of the plurality of digital images that are substantially similar in color.

* * * * *